United States Patent
Iwasaki et al.

(10) Patent No.: US 12,467,119 B2
(45) Date of Patent: Nov. 11, 2025

(54) DIAMOND SINTERED MATERIAL AND TOOL INCLUDING DIAMOND SINTERED MATERIAL

(71) Applicants: SUMITOMO ELECTRIC HARDMETAL CORP., Hyogo (JP); SUMITOMO ELECTRIC INDUSTRIES, LTD., Osaka (JP)

(72) Inventors: Hirotsugu Iwasaki, Hyogo (JP); Akihiko Ueda, Hyogo (JP); Michiko Matsukawa, Hyogo (JP); Satoru Kukino, Hyogo (JP); Kei Hirai, Osaka (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 395 days.

(21) Appl. No.: 18/032,168

(22) PCT Filed: Oct. 5, 2021

(86) PCT No.: PCT/JP2021/036845
§ 371 (c)(1),
(2) Date: Apr. 15, 2023

(87) PCT Pub. No.: WO2022/085438
PCT Pub. Date: Apr. 28, 2022

(65) Prior Publication Data
US 2023/0383387 A1 Nov. 30, 2023

(30) Foreign Application Priority Data
Oct. 22, 2020 (WO) .................. PCT/JP2020/039756

(51) Int. Cl.
C22C 26/00 (2006.01)
B22F 3/10 (2006.01)
B22F 3/24 (2006.01)
B22F 5/00 (2006.01)
B23B 27/14 (2006.01)
C22C 1/05 (2023.01)

(52) U.S. Cl.
CPC ............ *C22C 26/00* (2013.01); *B22F 3/1003* (2013.01); *B22F 3/24* (2013.01); *B22F 5/00* (2013.01); *B23B 27/148* (2013.01); *C22C 1/05* (2013.01); *B22F 2003/248* (2013.01); *B22F 2005/001* (2013.01); *B22F 2201/20* (2013.01); *B22F 2301/15* (2013.01); *B22F 2302/406* (2013.01); *B22F 2998/10* (2013.01); *B22F 2999/00* (2013.01); *B23B 2226/31* (2013.01)

(58) Field of Classification Search
CPC .... C22C 26/00; B22F 3/1003; B22F 2302/40; B23B 2226/31
See application file for complete search history.

(56) References Cited

FOREIGN PATENT DOCUMENTS

| | | |
|---|---|---|
| CN | 110090960 A | 8/2019 |
| JP | H04-037650 A | 2/1992 |
| JP | H5-194032 A | 8/1993 |
| JP | H6-305833 A | 11/1994 |
| JP | 2005-239472 A | 9/2005 |
| JP | 2009-508798 A | 3/2009 |
| JP | 2014-500226 A | 1/2014 |
| WO | 2007/035394 A2 | 3/2007 |
| WO | 2012/084750 A1 | 6/2012 |

OTHER PUBLICATIONS

International Search Report (ISR) for corresponding Application No. PCT/JP2021/036845, mailed Nov. 16, 2021.
T. Ungar and A. Borbely, "The effect of dislocation contrast on x-ray line broadening: A new approach to line profile analysis," Appl. Phys. Lett., vol. 69, No. 21, p. 3173, 1996.
T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, No. 10, pp. 3693-3699, 1998.
Willems. B. et al. Dislocation distributions in brown diamond. Physica Status Solidi. A. 1-5 Applications and Materials Science. 2006. vol. 203. No. 12. pp. 3076-3080.
International Search Report (ISR) for priority Application No. PCT/JP2020/039756, mailed Dec. 22, 2020.
Shul'zhenko et al., "Structure and Electrophysical Properties of the Diamond-Graphen-Silicon Carbide Composite", Journal of Superhard Materials, 2018, vol. 40, No. 6, pp. 435-438.
Voronin et al., "Properties of nanostructured diamond-silicon carbide composites sintered by high pressure infiltration technique", Journal of Materials Research, vol. 19, No. 9, Sep. 2004, pp. 2703-2707.
Pantea et al., "Dislocation density and graphitization of diamond crystals", Physical Review, B 66, 094106, 2002, pp. 1-6.
Gubicza et al., "Microstructure of diamond-SiC nanocomposites determined by X-ray line profile analysis, Diamond & Related Materials", vol. 15, 2006, pp. 1452-1456.
Nauyoks et al., "Stress and dislocations in diamond-SiC composites sintered at high pressure, high temperature conditions", Composites: Part A, vol. 40, No. 5, 2009, pp. 566-572.
Luo et al., "Tailoring the composite interface at lower temperature by the nanoscale interfacial active layer formed in cold sprayed cBN/NiCrAl nanocomposite", Materials and Design, vol. 140, 2018, pp. 387-399.

*Primary Examiner* — Pegah Parvini
(74) *Attorney, Agent, or Firm* — Renner, Otto, Boisselle & Sklar, LLP

(57) ABSTRACT

A diamond sintered material includes diamond grains, wherein a content ratio of the diamond grains is more than or equal to 80 volume % and less than or equal to 99 volume % with respect to the diamond sintered material, an average grain size of the diamond grains is more than or equal to 0.1 μm and less than or equal to 50 μm, and a dislocation density of the diamond grains is more than or equal to $8.1 \times 10^{13}$ m$^{-2}$ and less than $1.0 \times 10^{16}$ m$^{-2}$.

5 Claims, No Drawings

DIAMOND SINTERED MATERIAL AND TOOL INCLUDING DIAMOND SINTERED MATERIAL

The present disclosure relates to a diamond sintered material and a tool including the diamond sintered material. The present application claims priority based on PCT/JP2020/039756, which is an international application based on the Patent Cooperation Treaty (PCT) and filed on Oct. 22, 2020, the entire contents of which are incorporated herein by reference.

TECHNICAL FIELD

Background Art

A diamond sintered material has an excellent hardness, has no directional property in hardness, and has no cleavability. Hence, the diamond sintered material is widely used for tools such as a cutting bite, a dresser, and a die, as well as a drill bit and the like.

A conventional diamond sintered material is obtained by sintering a diamond powder, which is a source material, together with a sintering aid and a binder at high pressure and high temperature (generally, the pressure is about 5 to 8 GPa, and the temperature is about 1300 to 2200° C.) at which diamond is thermodynamically stable. Examples of the sintering aid usable include: an iron-group element metal such as Fe, Co, and Ni; a carbonate such as $CaCO_3$; and the like. Examples of the binder usable include ceramics such as SiC.

For example, Japanese Patent Laying-Open No. 2005-239472 (PTL 1) discloses a diamond sintered material having high strength and high wear resistance, the diamond sintered material including: sintered diamond grains having an average grain size of less than or equal to 2 μm; and a remainder of binder phase, wherein a content ratio of the sintered diamond grains in the diamond sintered material is more than or equal to 80 volume % and less than or equal to 98 volume %, the binder phase includes at least one element selected from a group consisting of titanium, zirconium, hafnium, vanadium, niobium, tantalum, chromium, and molybdenum at a content ratio of more than or equal to 0.5 mass % and less than 50 mass % in the binder phase, and cobalt at a content ratio of more than or equal to 50 mass % and less than 99.5 mass % in the binder phase, part or whole of the at least one element selected from the group consisting of titanium, zirconium, hafnium, vanadium, niobium, tantalum, chromium, and molybdenum is present as carbide grains having an average grain size of less than or equal to 0.8 μm, a structure of the carbide grains is discontinuous, and adjacent diamond grains are coupled to each other.

Further, PTL 1 discloses a method of producing a diamond sintered material having high strength and high wear resistance, wherein sintering is performed using a belt type ultrahigh pressure apparatus under a pressure of more than or equal to 5.7 GPa and less than or equal to 7.5 GPa at a temperature of more than or equal to 1400° C. and less than or equal to 1900° C.

CITATION LIST

Patent Literature

PTL 1: Japanese Patent Laying-Open No. 2005-239472

SUMMARY OF INVENTION

A diamond sintered material of the present disclosure includes diamond grains, wherein a content ratio of the diamond grains is more than or equal to 80 volume % and less than or equal to 99 volume % with respect to the diamond sintered material, an average grain size of the diamond grains is more than or equal to 0.1 μm and less than or equal to 50 μm, and a dislocation density of the diamond grains is more than or equal to $8.1 \times 10^{13}$ m$^{-2}$ and less than $1.0 \times 10^{16}$ m$^{-2}$.

A tool of the present disclosure includes the diamond sintered material.

DETAILED DESCRIPTION

Problem to be Solved by the Present Disclosure

When the diamond sintered material of PTL 1 is applied to a cutting tool or the like, the cutting edge of the cutting tool may be broken. Further, in recent years, a cutting process with higher efficiency (for example, high feeding rate) has been required, and therefore it has been expected to attain further improvement in performance of the diamond sintered material (for example, suppression of wear resulting from the cutting process).

The present disclosure has been made in view of the above-described circumstance and has an object to provide a diamond sintered material having excellent breakage resistance and excellent wear resistance, and a tool including the diamond sintered material.

Advantageous Effect of the Present Disclosure

According to the present disclosure, there can be provided a diamond sintered material having excellent breakage resistance and excellent wear resistance, and a tool including the diamond sintered material.

DESCRIPTION OF EMBODIMENTS

First, embodiments of the present disclosure are listed and described.

[1] A diamond sintered material according to one embodiment of the present disclosure includes diamond grains, wherein a content ratio of the diamond grains is more than or equal to 80 volume % and less than or equal to 99 volume % with respect to the diamond sintered material, an average grain size of the diamond grains is more than or equal to 0.1 μm and less than or equal to 50 μm, and a dislocation density of the diamond grains is more than or equal to $8.1 \times 10^{13}$ m$^{-2}$ and less than $1.0 \times 10^{16}$ m$^{-2}$.

The diamond sintered material has excellent breakage resistance and excellent wear resistance. The term "breakage resistance" as used herein means resistance against breakage of the tool during processing of a material. The term "wear resistance" as used herein means resistance against wear of the tool during the processing of the material.

[2] The dislocation density of the diamond grains is preferably more than or equal to $1.0 \times 10^{15}$ m$^{-2}$ and less than or equal to $7.0 \times 10^{15}$ m$^{-2}$. By defining in this way, the diamond sintered material has more excellent breakage resistance and wear resistance.

[3] Preferably, the diamond sintered material further includes a binder phase, wherein the binder phase includes at least one selected from a group consisting of a simple metal, an alloy, and an intermetallic compound including at least one metal element selected from a group consisting of a group 4 element, a group 5 element, a group 6 element in a periodic table, iron, aluminum, silicon, cobalt, and nickel, or at least one selected from a group consisting of a compound and a solid solution originated from the compound, the compound being composed of at least one metal element selected from the group consisting of the group 4 element, the group 5 element, the group 6 element in the periodic table, iron, aluminum, silicon, cobalt, and nickel and at least one non-metal element selected from a group consisting of nitrogen, carbon, boron and oxygen. By defining in this way, the diamond sintered material has more excellent breakage resistance.

[4] The binder phase preferably includes cobalt. By defining in this way, the diamond sintered material has more excellent breakage resistance.

[5] A tool according to one embodiment of the present disclosure includes the diamond sintered material.

Since the tool includes the diamond sintered material, the tool has excellent breakage resistance and excellent wear resistance in processing various types of materials.

Details of Embodiments of the Present Disclosure

Details of the embodiments of the present disclosure will be described below. It should be noted that the present disclosure is not limited to these examples. Here, in the present specification, the expression "A to Z" represents a range of lower to upper limits (i.e., more than or equal to A and less than or equal to Z). When no unit is indicated for A and a unit is indicated only for Z, the unit of A is the same as the unit of Z.

<<Diamond Sintered Material>>

A diamond sintered material according to the present embodiment includes diamond grains, wherein a content ratio of the diamond grains is more than or equal to 80 volume % and less than or equal to 99 volume % with respect to the diamond sintered material, an average grain size of the diamond grains is more than or equal to 0.1 μm and less than or equal to 50 μm, and a dislocation density of the diamond grains is more than or equal to $8.1 \times 10^{13}$ m$^{-2}$ and less than $1.0 \times 10^{16}$ m$^{-2}$.

The diamond sintered material includes diamond grains. That is, the diamond sintered material has diamond, which is in the form of grains, as its basic composition. In one aspect of the present embodiment, the diamond grains can be also regarded as diamond crystal grains. The diamond sintered material preferably further includes a binder phase (binder) formed by one or both of a sintering aid and a binder. The diamond grains and the binder phase will be described later.

The diamond sintered material is a polycrystalline material constituted of a plurality of diamond grains. Therefore, the diamond sintered material has no directional property (anisotropy) and no cleavability unlike the case of a single crystal, and has isotropic hardness and toughness in all the orientations.

The diamond sintered material may include an inevitable impurity as long as the effect of the present embodiment is exhibited. Examples of the inevitable impurity includes hydrogen, oxygen, and the like.

<Diamond Grains>
(Content Ratio of Diamond Grains)

In the present embodiment, the content ratio of the diamond grains is more than or equal to 80 volume % and less than or equal to 99 volume %, and preferably more than or equal to 80 volume % and less than or equal to 90 volume % with respect to the diamond sintered material.

The content ratio (volume %) of the diamond grains and the content ratio (volume %) of the below-described binder phase in the diamond sintered material can be checked by performing structure observation, elemental analysis, and the like onto the diamond sintered material using an energy dispersive X-ray analysis device (EDX) (Octane Elect EDS system) accompanied with a scanning electron microscope (SEM) ("JSM-7800F" (trade name) provided by JEOL) (hereinafter, also referred to as "SEM-EDX"). A specific measurement method thereof is as follows.

First, the diamond sintered material is cut at an arbitrary location to produce a sample including a cross section of the diamond sintered material. For the production of the cross section, a focused ion beam device, a cross section polisher device, or the like can be used. Next, the cross section is observed by the SEM to obtain a reflected electron image. In the reflected electron image, a black region represents a region in which the diamond grains exist and a gray or white region represents a region in which the binder phase exists. The magnification when observing the cross section by the SEM is appropriately adjusted such that the number of diamond grains observed in the measurement visual field is more than or equal to 100. For example, when the average grain size of the diamond grains is 0.5 μm, the magnification when observing the cross section by the SEM may be 10000×. When the average grain size of the diamond grains is 30 μm, the magnification when observing the cross section by the SEM may be 200×.

Next, the reflected electron image is subjected to binarization processing using image analysis software (such as "WinROOF ver.7.4.5", "WinROOF 2018", or the like provided by Mitani Corporation). The image analysis software automatically sets an appropriate binarization threshold based on image information (a measuring person does not set the threshold arbitrarily). Moreover, the inventors have confirmed that even when the brightness of the image or the like is changed, the result of measurement is not greatly varied. In accordance with the image having been through the binarization processing, the area ratio of pixels originated from dark fields (pixels originated from the diamond grains) in the area of the measurement visual field is calculated. By regarding the calculated area ratio as volume %, the content ratio (volume %) of the diamond grains can be found.

In accordance with the image having been through the binarization processing, the area ratio of pixels originated from bright fields (pixels originated from the binder phase) in the area of the measurement visual field is calculated, thereby finding the content ratio (volume %) of the binder phase.

As long as the content ratio (volume %) of the diamond grains and the content ratio (volume %) of the below-described binder phase in the diamond sintered material are measured in the same sample, the present inventors have confirmed that the result of measurement is not substantially varied even when a selected location for the measurement visual field is changed and the calculation is performed multiple times. That is, the present inventors consider that even when the measurement visual field is set arbitrarily, the result of measurement is not intentional.

It should be noted that an elemental analysis can be performed onto the diamond sintered material using SEM-EDX to confirm that the pixels originated from the dark fields are originated from the diamond grains.

(Average Grain Size of Diamond Grains)

The average grain size of the diamond grains is more than or equal to 0.1 μm and less than or equal to 50 μm, and preferably more than or equal to 0.2 μm and less than or equal to 40 μm. When the average grain size of the diamond grains is more than or equal to 0.1 μm, the diamond grains are densely sintered, with the result that the diamond sintered material has excellent breakage resistance. When the average grain size of the diamond grains is less than or equal to 50 μm, the diamond sintered material has no anisotropy and is excellent in cutting stability when used as a cutting edge of a cutting tool.

In the present embodiment, the average grain size of the diamond grains refers to a value obtained by calculating an average value of respective median sizes d50 of a plurality of diamond grains measured at five arbitrarily selected measurement visual fields. A specific method thereof is as follows.

First, the diamond sintered material is cut at an arbitrary location to produce a sample including a cross section of the diamond sintered material. For the production of the cross section, a focused ion beam device, a cross section polisher device, or the like can be used. Next, the cross section is observed by the SEM to obtain a reflected electron image. In the reflected electron image, a black region represents a region in which the diamond grains exist and a gray or white region represents a region in which the binder phase exists. The magnification when observing the cross section by the SEM is appropriately adjusted such that the number of diamond grains observed in the measurement visual field is more than or equal to 100. For example, when the average grain size of the diamond grains is 0.5 μm, the magnification when observing the cross section by the SEM may be 10000×. When the average grain size of the diamond grains is 30 μm, the magnification when observing the cross section by the SEM may be 200×.

For each of the five SEM images, the equivalent circle diameter of each diamond grain is calculated using image processing software ("WinROOF ver. 7.4.5", "WinROOF 2018" or the like of Mitani Corporation) in a state in which the grain boundaries of the diamond grains observed in the measurement visual field are separated. On this occasion, a diamond grain having a portion positioned outside the measurement visual field is not counted.

Median diameters d50 in the respective measurement visual fields are calculated in accordance with the distribution of the calculated equivalent circle diameters of the diamond grains, and the average value thereof is calculated. The average value corresponds to the average grain size of the diamond grains.

As long as the average grain size of the diamond grains is calculated in the same sample, the present inventors have confirmed that the result of measurement is not substantially varied even when a selected location for the measurement visual field is changed in the diamond sintered material and the calculation is performed multiple times. That is, the present inventors consider that even when the measurement visual field is set arbitrarily, the result of measurement is not intentional.

(Dislocation Density of Diamond Grains)

The dislocation density of the diamond grains is more than or equal to $8.1 \times 10^{13}$ m$^{-2}$ and less than $1.0 \times 10^{16}$ m$^{-2}$, and preferably more than or equal to $1.0 \times 10^{15}$ m$^{-2}$ and less than or equal to $7.0 \times 10^{15}$ m$^{-2}$. Since the dislocation density of the diamond grains is less than $1.0 \times 10^{16}$ m$^{-2}$, occurrence of cracks in the diamond grains can be suppressed, with the result that the diamond sintered material has excellent breakage resistance. Further, the diamond sintered material has a relatively high thermal conductivity. Therefore, thermal wear caused by an increase in temperature of the cutting edge during cutting can be suppressed. It should be noted that the present inventors have confirmed that a diamond sintered material in which the dislocation density of the diamond grains is less than $8.1 \times 10^{13}$ m$^{-2}$ cannot be produced.

Conventionally, no attention has been paid to a correlation between the dislocation density of the diamond grains in the diamond sintered material and the physical property of the diamond sintered material. Hence, the present inventors have diligently investigated a relation between the dislocation density of the diamond grains in the diamond sintered material and the breakage resistance and wear resistance of the diamond sintered material. As a result, it has been found for the first time that when the dislocation density of the diamond grains is decreased as compared with the conventional diamond sintered material, occurrence of cracks due to slip motion of the dislocations in the diamond grains is suppressed, thereby improving the breakage resistance. Further, it has been found for the first time that by decreasing the dislocation density of the diamond grains, wear during cutting can be suppressed. This is presumably due to the following reason: by decreasing the dislocation density, heat generated during cutting can be effectively transmitted to the whole of the diamond sintered material, thereby suppressing wear of the diamond sintered material due to the heat generation. This investigation has revealed that the dislocation density of the diamond grains of the conventional diamond sintered material (for example, the diamond sintered material described in PTL 1) is more than or equal to $1.01 \times 10^{16}$ m$^{-2}$ and less than $1.18 \times 10^{16}$ m$^{-2}$.

In the present specification, the dislocation density of the diamond sintered material is measured in a large-scale radiation facility (for example, Kyushu Synchrotron Light Research Center (Saga prefecture). Specifically, the measurement is performed by the following method.

A specimen composed of the diamond sintered material is prepared. The size of the observation surface of the specimen is 3 mm×6 mm and the thickness thereof is 0.4 mm. The observation surface of the specimen is mirror-polished using a diamond slurry having an average particle size of 3 μm, and is then immersed in hydrochloric acid for 72 hours. Thus, the binder phase is dissolved in the hydrochloric acid at the observation surface of the specimen, whereas the diamond grains remain.

The specimen is subjected to an X-ray diffraction measurement under the following conditions to obtain line profiles of diffraction peaks from respective orientation planes of (111), (220), (311), (331), (422), (440) and (531), which are major orientations of diamond.

(Conditions for X-Ray Diffraction Measurement)

X-ray source: synchrotron radiation

Equipment condition: detector NaI (fluorescence is cut with appropriate ROI.)

Energy: 18 keV (wavelength: 0.6888 Å)

Dispersive crystal: Si (111)

Incident slit: width 3 mm×height 0.5 mm

Light-receiving slit: double slit (width 3 mm×height 0.5 mm)

Mirror: platinum-coated mirror

Incidence angle: 2.5 mrad

Scanning method: 2θ-θ scan

Measurement peaks: seven peaks from (111), (220), (311), (331), (422), (440), and (531) of diamond. When it is difficult to obtain a profile depending on texture and orientation, the peak for that Miller index is excluded.

Measuring condition: there are 9 or more measurement points set in the full width at half maximum corresponding to each measurement peak. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the specimen's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ is used as a standard sample for removing a broadening of a diffracted peak attributed to the equipment. When significantly collimated radiation is used, a broadening of a diffracted peak attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

$$\Delta K = \frac{0.9}{D} + \left(\frac{\pi M^2 b^2}{2}\right)^{1/2} \rho^{1/2} K C^{1/2} + O(K^2 C) \quad \text{(I)}$$

In the expression (I), $\Delta K$ represents a half width of a line profile. D represents a crystallite size. M represents a dislocation arrangement parameter. b represents a Burgers vector. $\rho$ represents dislocation density. K represents a scattering vector. $O(K^2C)$ represents a higher-order term of $K^2C$. C represents an average contrast factor.

C in the above expression (I) is represented by the following expression (II):

$$C=C_{h00}[1-q(h^2k^2+h^2l^2+k^2l^2)/(h^2+k^2+l^2)^2] \quad \text{(II)}$$

In the above expression (II), a contrast factor $C_{h00}$ for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 1076 GPa, 125 GPa, and 576 GPa, respectively. In the expression (II), h, k, and l respectively correspond to the Miller indices (hkl) of the diamond. Contrast factor $C_{h00}$ is 0.183 for screw dislocation and 0.204 for edge dislocation. The coefficient q for the contrast factor is 1.35 for screw dislocation and 0.30 for edge dislocation. Note that screw dislocation's ratio is fixed to 0.5 and edge dislocation's ratio is fixed to 0.5.

Furthermore, between dislocation and inhomogeneous strain, a relation represented by an expression (III) is established using contrast factor C, as below. In the expression (III), $R_e$ represents dislocation's effective radius. $\varepsilon(L)$ represents inhomogeneous strain.

$$\langle\varepsilon(L)^2\rangle=(\rho Cb^2/4\pi)\ln(R_e/L) \quad \text{(III)}$$

By the relation of the above expression (III) and the Warren-Averbach expression, the following expression (IV) can be presented, and as the modified Warren-Averbach method, dislocation density $\rho$ and a crystallite size can be determined. In the following expression (IV), A(L) represents a Fourier series. $A^S(L)$ represents a Fourier series for a crystallite size. L represents a Fourier length.

$$\ln A(L)=\ln A^S(L)-(\pi L^2\rho b^2/2)\ln(R_e/L)(K^2C)+O(K^2C)^2 \quad \text{(IV)}$$

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

As long as the dislocation density of the diamond grains is measured in the same sample, the present inventors have confirmed that the result of measurement is not substantially varied even when the selected location for the measurement range is changed and the calculation is performed multiple times. That is, the present inventors consider that even when the measurement visual field is set arbitrarily, the result of measurement is not intentional.

<Binder Phase>

Preferably, in the present embodiment, the diamond sintered material further includes a binder phase, wherein
the binder phase includes
at least one selected from a group consisting of a simple metal, an alloy, and an intermetallic compound including at least one metal element selected from a group (hereinafter, also referred to as "group A") consisting of a group 4 element, a group 5 element, a group 6 element in a periodic table, iron, aluminum, silicon, cobalt, and nickel, or
at least one selected from a group consisting of a compound and a solid solution originated from the compound, the compound being composed of at least one metal element selected from the group (group A) consisting of the group 4 element, the group 5 element, the group 6 element in the periodic table, iron, aluminum, silicon, cobalt, and nickel and at least one non-metal element selected from a group (hereinafter, also referred to as "group B") consisting of nitrogen, carbon, boron, and oxygen. In other words, the binder phase can be in any one of the following forms (a) to (f).
(a) The binder phase is composed of at least one selected from the group consisting of the simple metal, the alloy, and the intermetallic compound including at least one metal element selected from group A.
(b) The binder phase includes at least one selected from the group consisting of the simple metal, the alloy, and the intermetallic compound including at least one metal element selected from group A.
(c) The binder phase is composed of at least one selected from the group consisting of the compound and the solid solution originated from the compound, the compound being composed of at least one metal element selected from group A and at least one non-metal element selected from group B.
(d) The binder phase includes at least one selected from the group consisting of the compound and the solid solution originated from the compound, the compound being composed of at least one metal element selected from group A and at least one non-metal element selected from group B.

(e) The binder phase is composed of: at least one selected from the group consisting of the simple metal, the alloy, and the intermetallic compound including at least one metal element selected from group A; and at least one selected from the group consisting of the compound and the solid solution originated from the compound, the compound being composed of at least one metal element selected from group A and at least one non-metal element selected from group B.

(f) The binder phase includes: at least one selected from the group consisting of the simple metal, the alloy, and the intermetallic compound including at least one metal element selected from group A; and at least one selected from the group consisting of the compound and the solid solution originated from the compound, the compound being composed of at least one metal element selected from group A and at least one non-metal element selected from group B.

The group 4 element in the periodic table includes titanium (Ti), zirconium (Zr), and hafnium (Hf), for example. The group 5 element includes vanadium (V), niobium (Nb), and tantalum (Ta), for example. The group 6 element includes chromium (Cr), molybdenum (Mo), and tungsten (W), for example.

In one aspect of the present embodiment, the binder phase preferably includes at least one selected from a group consisting of cobalt, titanium, iron, tungsten and boron, and more preferably includes cobalt.

The composition of the binder phase included in the diamond sintered material can be specified by the EDX accompanied with the SEM.

(Content Ratio of Binder Phase)

The content ratio of the binder phase is preferably more than or equal to 1 volume % and less than or equal to 20 volume %, more preferably more than or equal to 10 volume % and less than or equal to 20 volume % with respect to the diamond sintered material. The content ratio (volume %) of the binder phase can be checked by performing structure observation, elemental analysis, and the like onto the diamond sintered material using the EDX accompanied with the SEM.

<<Tool>>

The diamond sintered material of the present embodiment has excellent breakage resistance and wear resistance, and can be therefore suitably used for a cutting tool, a wear-resistant tool, a grinding tool, a friction stir welding tool, and the like. That is, the tool of the present embodiment includes the above-described diamond sintered material. The tool has excellent breakage resistance and excellent wear resistance in processing of various types of materials. When the tool is a cutting tool, the cutting tool is particularly suitable for milling and turning of an aluminum alloy (for example, A390 or AC4C) or the like.

The above-described tool may be entirely constituted of the diamond sintered material, or only a portion thereof (for example, a cutting edge portion in the case of the cutting tool) may be constituted of the diamond sintered material.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like.

Examples of the grinding tool include a grinding stone and the like.

<<Method of Producing Diamond Sintered Material>>

A method of producing a diamond sintered material according to the present embodiment includes the steps of:

preparing a source material powder for diamond grains and a source material powder for a binder phase;

obtaining a powder mixture by mixing the source material powder for the diamond grains and the source material powder for the binder phase;

sintering the powder mixture under a sintering pressure of more than or equal to 4 GPa and less than 5 GPa at a sintering temperature of more than or equal to 1400° C. and less than or equal to 1550° C. for a sintering time of more than or equal to 15 minutes and less than or equal to 60 minutes; and decreasing dislocations in the diamond grains by heating the powder mixture under a holding pressure of more than or equal to 6.5 GPa and less than or equal to 8 GPa at a holding temperature of more than or equal to 1600° C. and less than or equal to 1900° C. for a holding time of more than or equal to 50 minutes and less than or equal to 190 minutes.

<Step of Preparing Source Material Powder for Diamond Grains and Source Material Powder for Binder Phase>

In this step, the source material powder for the diamond grains (hereinafter, also referred to as "diamond powder") and the source material powder for the binder phase (hereinafter, also referred to as "binder phase source material powder") are prepared. The diamond powder is not particularly limited, and known diamond particles can be used as the source material powder.

The average particle size of the diamond powder is not particularly limited, and can be, for example, more than or equal to 0.1 µm and less than or equal to 50 µm.

The binder phase source material powder is not particularly limited and may be any powder including the constituent element(s) of the binder phase. Examples of the binder phase source material powder include cobalt powder, titanium powder, and the like. For the binder phase source material powder, one type of powder may be used solely, or a plurality of types of powders may be used in combination, depending on the composition of the binder phase to be obtained.

<Step of Obtaining Powder Mixture>

In this step, the source material powder (diamond powder) for the diamond grains and the source material powder (binder phase source material powder) for the binder phase are mixed to obtain the powder mixture. On this occasion, the diamond powder and the binder phase source material powder may be mixed at an appropriate blending ratio such that the content ratio of the diamond grains in the diamond sintered material falls within the above-described range.

A method of mixing both the powders is not particularly limited, and may be a mixing method using an attritor or a mixing method using a ball mill. The mixing method may be performed in a wet manner or a dry manner.

<Step of Sintering Powder Mixture>

In this step, the powder mixture is sintered under a sintering pressure of more than or equal to 4 GPa and less than 5 GPa at a sintering temperature of more than or equal to 1400° C. and less than or equal to 1550° C. for a sintering time of more than or equal to 15 minutes and less than or equal to 60 minutes.

In the present embodiment, a manner of transition from a state at a normal temperature (23±5° C.) under an atmospheric pressure to the state under the above-described sintering pressure at the above-described sintering temperature is not particularly limited.

A high-pressure high-temperature generation apparatus used in the method of producing the diamond sintered material of the present embodiment is not particularly limited as long as the target pressure and temperature conditions can be attained by the apparatus. In order to increase productivity and operability, the high-pressure high-temperature generation apparatus is preferably a belt type high-pressure high-temperature generation apparatus. A container for storing the powder mixture is not particularly limited as long as the container is composed of a material having high-pressure resistance and high-temperature resistance, and tantalum (Ta), niobium (Nb), or the like is suitably used therefor, for example.

In order to prevent an impurity from being introduced into the diamond sintered material, for example, first, the powder mixture is placed in a capsule composed of a high melting point metal such as Ta or Nb, is heated in vacuum, and is sealed so as to remove adsorption gas and air from the powder mixture. Then, it is preferable to perform the above-described step of sintering the powder mixture and the below-described step of decreasing the dislocations in the diamond grains. In one aspect of the present embodiment, after the step of sintering the powder mixture, the step of decreasing the dislocations in the diamond grains is preferably performed in a manner continuous to the step of sintering the powder mixture without taking out the powder mixture from the capsule composed of the high melting point metal.

The sintering pressure is preferably more than or equal to 4 GPa and less than 5 GPa, and more preferably more than or equal to 4.5 GPa and less than 5 GPa.

The sintering temperature is preferably more than or equal to 1400° C. and less than or equal to 1550° C., more preferably more than or equal to 1450° C. and less than or equal to 1550° C.

The sintering time is preferably more than or equal to 15 minutes and less than or equal to 60 minutes, and more preferably more than or equal to 15 minutes and less than or equal to 20 minutes.

<Step of Decreasing Dislocations in Diamond Grains>

In this step, the powder mixture is heated under a holding pressure of more than or equal to 6.5 GPa and less than or equal to 8 GPa at a holding temperature of more than or equal to 1600° C. and less than or equal to 1900° C. for a holding time of more than or equal to 50 minutes and less than or equal to 190 minutes so as to decrease the dislocations in the diamond grains. Thus, the diamond sintered material of the present disclosure is obtained. The present inventors consider that this step promotes melting/re-precipitation reaction of the diamond; however, the re-precipitated diamond grains have small amount of dislocations, thereby obtaining a diamond sintered material having a small amount of dislocations.

The holding pressure is preferably more than or equal to 6.5 GPa and less than or equal to 8 GPa, and more preferably more than or equal to 6.5 GPa and less than or equal to 7 GPa.

The holding temperature is preferably more than or equal to 1600° C. and less than or equal to 1900° C., and more preferably more than or equal to 1600° C. and less than or equal to 1700° C.

The holding time is preferably more than or equal to 50 minutes and less than or equal to 190 minutes, and more preferably more than or equal to 60 minutes and less than or equal to 180 minutes.

EXAMPLES

The following describes the present embodiment more specifically by way of examples. However, the present embodiment is not limited by these examples.

<<Production of Diamond Sintered Material>>

<Step of Preparing Source Material Powder for Diamond Grains and Source Material Powder for Binder Phase>

Powders having average particle sizes or compositions shown in Tables 1-1 and 1-2 were prepared as source material powders.

TABLE 1-1

| Sample | Source Material Powder for Diamond Grains Average Particle Size (μm) | Source Material Powder for Binder Phase Composition (Mass Ratio) |
|---|---|---|
| 1 | 0.5 | Co, Ti (75:25) |
| 2 | 0.5 | Co, Ti (75:25) |
| 3 | 0.5 | Co, Ti (75:25) |
| 4 | 0.5 | Co, Ti (75:25) |
| 5 | 0.5 | Co, Ti (75:25) |
| 6 | 0.5 | Co, Ti (75:25) |
| 7 | 0.5 | Co, Ti (75:25) |
| 8 | 0.5 | Co, Ti (75:25) |
| 9 | 0.5 | Co, Ti (75:25) |
| 10 | 0.5 | Co, Ti (75:25) |
| 11 | 0.5 | Co, Ti (75:25) |
| 12 | 0.5 | Co (100) |
| 13 | 0.5 | Co, Fe (99:1) |
| 14 | 0.5 | Co, B (99:1) |
| 15 | 0.2 | Co, Ti (75:25) |
| 16 | 0.5 | Co, Ti (75:25) |
| 17 | 5.0 | Co, Ti (75:25) |
| 18 | 30.0 | Co, Ti (75:25) |
| 19 | 45.0 | Co, Ti (75:25) |
| 20 | 55.0 | Co, Ti (75:25) |

TABLE 1-2

| Sample | Source Material Powder for Diamond Grains Average Particle Size (μm) | Source Material Powder for Binder Phase Composition (Mass Ratio) |
|---|---|---|
| 21 | 30.0 | Co, W (95:5) |
| 22 | 30.0 | Co, W (95:5) |
| 23 | 30.0 | Co, W (95:5) |
| 24 | 30.0 | Co, W (95:5) |
| 25 | 30.0 | Co, W (95:5) |
| 26 | 30.0 | Co, W (95:5) |
| 27 | 30.0 | Co, W (95:5) |
| 28 | 30.0 | Co, W (95:5) |
| 29 | 25.0 | Co, W (95:5) |
| 30 | 30.0 | Co, W (95:5) |
| 31 | 30.0 | Co, W (95:5) |
| 32 | 30.0 | Co (100) |

<Step of Obtaining Powder Mixture>

The prepared source material powders were added at various blending ratios such that diamond sintered materials to be finally obtained had compositions shown in Table 3-1 or Table 3-2, and were dry-mixed using a ball mill, thereby producing powder mixtures. Here, each of the powder mixtures is sintered in contact with a disk composed of WC-6% Co cemented carbide as described later. Therefore, it is considered that cobalt and tungsten are melted and introduced into the diamond sintered material from the disk during the sintering, with the result that the content ratio of cobalt and the content ratio of tungsten in the diamond sintered material are increased. The blending ratio of each source material powder was determined in consideration of the increase in the content ratio of cobalt and the increase in the content ratio of tungsten in advance.

<Step of Sintering Powder Mixture>

Next, the powder mixture was placed in a capsule composed of Ta in contact with the disk composed of WC-6% Co cemented carbide, was heated in vacuum, and was sealed. Then, using a high-pressure high-temperature generation apparatus, the powder mixture was heated under a sintering pressure at a sintering temperature for a sintering time as shown in Table 2-1 or Table 2-2.

<Step of Decreasing Dislocations in Diamond Grains>

After the step of sintering the powder mixture, the powder mixture was heated under a holding pressure at a holding temperature for a holding time as shown in Table 2-1 or Table 2-2. It should be noted that this step was not performed for samples 8 and 28. Through the above-described steps, diamond sintered materials of samples 1 to 32 were produced.

<<Evaluation on Characteristics of Diamond Sintered Material>>

<Composition of Diamond Sintered Material>

The content ratios (volume ratios) of the diamond grains and the binder phase in the diamond sintered material were measured. Since a specific measuring method is the same as the method described in the above-described section [Details of Embodiments of the Present Disclosure], the method will not be described repeatedly. In each of the samples, it was confirmed that the content ratio of the diamond grains in the diamond sintered material was as shown in Tables 3-1 and 3-2 (see the column "Content Ratio").

<Average Grain Size of Diamond Grains>

The average grain size of the diamond grains in the diamond sintered material was measured. Since a specific measuring method is the same as the method described in the section [Details of Embodiments of the Present Disclosure], the method will not be described repeatedly. Results are shown in Tables 3-1 and 3-2 (see the column "Average Grain Size").

TABLE 2-1

| | Step of Sintering | | | Step of Decreasing Dislocations | | |
|---|---|---|---|---|---|---|
| Sample | Sintering Pressure (GPa) | Sintering Temperature (° C.) | Sintering Time (min) | Holding Pressure (GPa) | Holding Temperature (° C.) | Holding Time (min) |
| 1 | 4.9 | 1500 | 15 | 7 | 1650 | 180 |
| 2 | 4.9 | 1500 | 15 | 7 | 1650 | 160 |
| 3 | 4.9 | 1500 | 15 | 7 | 1650 | 140 |
| 4 | 4.9 | 1500 | 15 | 7 | 1650 | 120 |
| 5 | 4.9 | 1500 | 15 | 7 | 1650 | 100 |
| 6 | 4.9 | 1500 | 15 | 7 | 1650 | 80 |
| 7 | 4.9 | 1500 | 15 | 7 | 1650 | 60 |
| 8 | 7 | 1500 | 30 | — | — | — |
| 9 | 7 | 1500 | 30 | 7 | 1650 | 40 |
| 10 | 4.9 | 1500 | 15 | 7 | 1650 | 120 |
| 11 | 4.9 | 1500 | 15 | 7 | 1650 | 120 |
| 12 | 4.9 | 1500 | 15 | 7 | 1650 | 120 |
| 13 | 4.9 | 1500 | 15 | 7 | 1650 | 120 |
| 14 | 4.9 | 1500 | 15 | 7 | 1650 | 120 |
| 15 | 4.9 | 1500 | 15 | 7 | 1650 | 120 |
| 16 | 4.9 | 1500 | 15 | 7 | 1650 | 120 |
| 17 | 4.9 | 1500 | 15 | 7 | 1650 | 120 |
| 18 | 4.9 | 1500 | 15 | 7 | 1650 | 120 |
| 19 | 4.9 | 1500 | 15 | 7 | 1650 | 120 |
| 20 | 4.9 | 1500 | 15 | 7 | 1650 | 120 |

TABLE 2-2

| | Step of Sintering | | | Step of Decreasing Dislocations | | |
|---|---|---|---|---|---|---|
| Sample | Sintering Pressure (GPa) | Sintering Temperature (° C.) | Sintering Time (min) | Holding Pressure (GPa) | Holding Temperature (° C.) | Holding Time (min) |
| 21 | 4.9 | 1500 | 15 | 7 | 1650 | 180 |
| 22 | 4.9 | 1500 | 15 | 7 | 1650 | 160 |
| 23 | 4.9 | 1500 | 15 | 7 | 1650 | 140 |
| 24 | 4.9 | 1500 | 15 | 7 | 1650 | 120 |
| 25 | 4.9 | 1500 | 15 | 7 | 1650 | 100 |
| 26 | 4.9 | 1500 | 15 | 7 | 1650 | 80 |
| 27 | 4.9 | 1500 | 15 | 7 | 1650 | 60 |
| 28 | 7 | 1500 | 30 | — | — | — |
| 29 | 7 | 1500 | 30 | 7 | 1650 | 35 |
| 30 | 4.9 | 1500 | 15 | 7 | 1650 | 120 |
| 31 | 4.9 | 1500 | 15 | 7 | 1650 | 120 |
| 32 | 4.9 | 1500 | 15 | 7 | 1650 | 120 |

<Composition of Binder Phase>

The composition of the binder phase in the diamond sintered material was specified by SEM-EDX. Since a specific measuring method is the same as the method described in the section [Details of Embodiments of the Present Disclosure], the method will not be described repeatedly. Results are shown in Tables 3-1 and 3-2 (see the column "Composition of Binder Phase").

<Dislocation Density of Diamond Grains>

The dislocation density of the diamond grains in the diamond sintered material was measured. Since a specific measuring method is the same as the method described in the section [Details of Embodiments of the Present Disclosure], the method will not be described repeatedly. Results are shown in Tables 3-1 and 3-2 (see the column "Dislocation Density").

<<Evaluation on Tool Including Diamond Sintered Material>>

<Cutting Test 1: Turning Test>

A cutting tool (holder: CSRP R3225-N12; insert: SPGN120304; a tool including the diamond sintered material at a cutting edge portion of an insert) was produced using each of the diamond sintered materials of samples 1 to 14 produced as described above, and was subjected to a turning test. Cutting conditions for the turning test are shown below. In the turning test, as the cutting distance (km) is longer, the cutting tool can be evaluated to have more excellent breakage resistance and wear resistance. Results are shown in Table 3-1. In cutting test 1, each of samples 1 to 7, 10 and 12 to 14 corresponds to an example of the present disclosure. Each of samples 8, 9, and 11 corresponds to a comparative example.

(Cutting Conditions for Turning Test)
 Workpiece: A390 (φ120 mm×280 mm)
 Cutting speed: 800 m/min
 Feed amount: 0.12 mm/rev
 Depth of cut: 0.5 mm
 Coolant: wet
 Evaluation method: cutting distance (km) until the average flank wear width of the cutting tool reached 250 μm when turning the outer diameter of the workpiece was measured.

<Cutting Test 2: Turning Test>

A cutting tool (holder: CSRP R3225-N12: insert: SPGN120308; a tool including the diamond sintered material at a cutting edge of an insert) was produced using each of the diamond sintered materials of samples 15 to 20 produced as described above, and was subjected to a turning test. Cutting conditions for the turning test are shown below. In the turning test, as the cutting distance (km) is longer, the cutting tool can be evaluated to have more excellent breakage resistance and wear resistance. Results are shown in Table 3-1. In cutting test 2, each of samples 15 to 19 corresponds to an example of the present disclosure. Sample 20 corresponds to a comparative example.

(Cutting Conditions for Turning Test)
 Workpiece: Ti-6Al-4V (φ120 mm×280 mm)
 Cutting speed: 250 m/min
 Feed amount: 0.1 mm/rev
 Depth of cut: 0.4 mm
 Coolant: wet
 Evaluation method: cutting distance (km) until the average flank wear width of the cutting tool reached 200 μm when turning the outer diameter of the workpiece was measured.

TABLE 3-1

| | Diamond Sintered Material | | | | Performance Evaluation | |
| | Diamond Grains | | | | | |
| Sample | Average Grain Size (μm) | Content Ratio (Volume %) | Composition of Binder Phase (Mass Ratio) | Dislocation Density ($\times 10^{15}$ m$^{-2}$) | Evaluation Method | Cutting Distance (km) |
| --- | --- | --- | --- | --- | --- | --- |
| 1 | 0.5 | 90.0 | Co, Ti, W (84:14:2) | 0.1 | Cutting Test 1 | 10.3 |
| 2 | 0.5 | 90.0 | Co, Ti, W (83:15:2) | 0.9 | | 17.4 |
| 3 | 0.5 | 90.0 | Co, Ti, W (83:15:2) | 1.2 | | 18.1 |
| 4 | 0.5 | 90.0 | Co, Ti, W (83:15:2) | 5.8 | | 20.2 |
| 5 | 0.5 | 90.0 | Co, Ti, W (83:15:2) | 6.9 | | 17.9 |
| 6 | 0.5 | 90.0 | Co, Ti, W (83:15:2) | 7.1 | | 17.5 |
| 7 | 0.5 | 90.0 | Co, Ti, W (82:16:2) | 9.8 | | 11.6 |
| 8 | 0.5 | 90.0 | Co, Ti, W (80:18:2) | 10.2 | | Initial Breakage |
| 9 | 0.5 | 90.0 | Co, Ti, W (80:18:2) | 11.5 | | Initial Breakage |
| 10 | 0.5 | 81.0 | Co, Ti, W (82:16:2) | 5.8 | | 10.1 |
| 11 | 0.5 | 79.0 | Co, Ti, W (82:16:2) | 5.8 | | Initial Breakage |
| 12 | 0.5 | 90.0 | Co, W (98:2) | 5.8 | | 16.7 |
| 13 | 0.5 | 90.0 | Co, Fe, W (97:1:2) | 5.8 | | 20.1 |
| 14 | 0.5 | 90.0 | Co, B, W (97:1:2) | 5.8 | | 20.2 |
| 15 | 0.2 | 90.0 | Co, Ti, W (83:15:2) | 5.8 | Cutting Test 2 | 3.5 |
| 16 | 0.5 | 90.0 | Co, Ti, W (83:15:2) | 5.8 | | 4.0 |
| 17 | 5.0 | 90.0 | Co, Ti, W (83:15:2) | 5.8 | | 4.2 |
| 18 | 30.0 | 90.0 | Co, Ti, W (84:14:2) | 5.8 | | 4.5 |
| 19 | 45.0 | 90.0 | Co, Ti, W (84:14:2) | 5.8 | | 5.0 |
| 20 | 55.0 | 90.0 | Co, Ti, W (84:14:2) | 5.8 | | Initial Breakage |

Results

In view of the results of cutting test 1, each of the cutting tools of samples 1 to 7, 10 and 12 to 14 (the cutting tools of the examples of the present disclosure) achieved an excellent result, i.e., the cutting distance was more than or equal to 10.1 km. On the other hand, in each of the cutting tools of samples 8, 9, and 11 (the cutting tools of the comparative examples), breakage occurred at the initial stage of cutting, with the result that the cutting distance could not be found. In view of the above results, it was found that each of the cutting tools of the examples of the present disclosure has more excellent breakage resistance and wear resistance than those of each of the cutting tools of the comparative examples.

In view of the results of cutting test 2, each of the cutting tools of samples 15 to 19 (the cutting tools of the examples of the present disclosure) achieved excellent results, i.e., the cutting distance was more than or equal to 3.5 km. On the other hand, in the cutting tool of sample 20 (the cutting tool of the comparative example), breakage occurred at the initial stage of cutting, with the result that the cutting distance could not be found. In view of the above results, it was found that each of the cutting tools of the examples of the present disclosure has more excellent breakage resistance and wear resistance than those of each of the cutting tools of the comparative examples.

<Cutting Test 3: Turning Test>

A cutting tool (holder: CSRP R3225-N12; insert: SPGN120304; a tool including the diamond sintered material at a cutting edge portion of an insert) was produced using each of the diamond sintered materials of samples 21 to 32 produced as described above, and was subjected to a turning test. Cutting conditions for the turning test are shown below. In the turning test, as the cutting distance (km) is longer, the cutting tool can be evaluated to have more excellent breakage resistance and wear resistance. Results are shown in Table 3-2. In cutting test 3, each of samples 21 to 27, 30 and 32 corresponds to an example of the present disclosure. Each of samples 28, 29, and 31 corresponds to a comparative example.

(Cutting Conditions for Turning Test)
  Workpiece: AC4C (φ120 mm/280 mm)
  Cutting speed: 1200 m/min
  Feed amount: 0.2 mm/rev
  Depth of cut: 1.2 mm
  Coolant: wet
  Evaluation method: cutting distance (kin) until the average flank wear width of the cutting tool reached 250 μm when turning the outer diameter of the workpiece was measured.

Results

In view of the results of cutting test 3, each of the cutting tools of samples 21 to 27, 30 and 32 (the cutting tools of the examples of the present disclosure) achieved an excellent result, i.e., the cutting distance was more than or equal to 12.2 km. On the other hand, in each of the cutting tools of samples 28, 29 and 31 (the cutting tools of the comparative examples), breakage occurred at the initial stage of cutting, with the result that the cutting distance could not be found. In view of the above results, it was found that each of the cutting tools of the examples of the present disclosure has more excellent breakage resistance and wear resistance than those of each of the cutting tools of the comparative examples.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A diamond sintered material comprising diamond grains, wherein
  a content ratio of the diamond grains is more than or equal to 80 volume % and less than or equal to 99 volume % with respect to the diamond sintered material,
  an average grain size of the diamond grains is more than or equal to 0.1 μm and less than or equal to 50 μm, and
  a dislocation density of the diamond grains is more than or equal to $8.1 \times 10^{13}$ m$^{-2}$ and less than $1.0 \times 10^{16}$ m$^{-2}$.

2. The diamond sintered material according to claim 1, wherein the dislocation density of the diamond grains is more than or equal to $1.0 \times 10^{15}$ m$^{-2}$ and less than or equal to $7.0 \times 10^{15}$ m$^{-2}$.

3. The diamond sintered material according to claim 1, further comprising a binder phase, wherein
  the binder phase includes

TABLE 3-2

| | Diamond Sintered Material | | | | Performance Evaluation | |
| | Diamond Grains | | Composition of | Dislocation | | Cutting |
| Sample | Average Grain Size (μm) | Content Ratio (Volume %) | Binder Phase (Mass Ratio) | Density ($\times 10^{15}$ m$^{-2}$) | Evaluation Method | Distance (km) |
|---|---|---|---|---|---|---|
| 21 | 30.0 | 95.0 | Co, W (93:7) | 0.2 | Cutting | 12.2 |
| 22 | 30.0 | 95.0 | Co, W (93:7) | 0.8 | Test 3 | 18.8 |
| 23 | 30.0 | 95.0 | Co, W (93:7) | 1.1 | | 20.3 |
| 24 | 30.0 | 95.0 | Co. W (93:7) | 4.5 | | 23.5 |
| 25 | 30.0 | 95.0 | Co, W (93:7) | 6.8 | | 19.9 |
| 26 | 30.0 | 95.0 | Co, W (93:7) | 7.3 | | 18.4 |
| 27 | 30.0 | 95.0 | Co, W (93:7) | 9.9 | | 13.7 |
| 28 | 30.0 | 95.0 | Co, W (94:6) | 10.1 | | Initial Breakage |
| 29 | 25.0 | 95.0 | Co, W (94:6) | 11.8 | | Initial Breakage |
| 30 | 30.0 | 98.0 | Co, W (95:5) | 4.5 | | 13.0 |
| 31 | 30.0 | 99.2 | Co, W (95:5) | 4.5 | | Initial Breakage |
| 32 | 30.0 | 95.0 | Co, W (98:2) | 4.5 | | 15.5 | at least one selected from a group consisting of a simple metal, an alloy, and an intermetallic compound including at least one metal element selected from a group consisting of a group 4 element, a group 5 element, a group 6 element in a periodic table, iron, aluminum, silicon, cobalt, and nickel, or at least one selected from a group consisting of a compound and a solid solution originated from the compound, the compound being composed of at least one metal element selected from the group consisting of the group 4 element, the group 5 element, the group 6 element in the periodic table, iron, aluminum, silicon, cobalt, and nickel and at least one non-metal element selected from a group consisting of nitrogen, carbon, boron and oxygen.

4. The diamond sintered material according to claim 3, wherein the binder phase includes cobalt.

5. A tool comprising the diamond sintered material according to claim 1.

* * * * *